United States Patent
Vajapeyam et al.

(10) Patent No.: US 9,049,730 B2
(45) Date of Patent: Jun. 2, 2015

(54) UPLINK DATA TRANSMISSION WITH INTERFERENCE MITIGATION

(71) Applicant: QUALCOMM Incorporated, San Diego, CA (US)

(72) Inventors: Madhavan Srinivasan Vajapeyam, San Diego, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 13/670,279

(22) Filed: Nov. 6, 2012

(65) Prior Publication Data

US 2013/0121186 A1 May 16, 2013

Related U.S. Application Data

(60) Provisional application No. 61/559,579, filed on Nov. 14, 2011.

(51) Int. Cl.
*H04W 24/00* (2009.01)
*H04W 72/08* (2009.01)
(Continued)

(52) U.S. Cl.
CPC .......... *H04W 72/085* (2013.01); *H04W 72/121* (2013.01); *H04W 72/14* (2013.01)

(58) Field of Classification Search
CPC ..... H04L 47/10; H04L 43/50; H04L 43/0852; H04L 43/00; H04L 12/2697
USPC ......................................................... 370/252
See application file for complete search history.

(56) References Cited

U.S. PATENT DOCUMENTS 6,684,075 B2    1/2004   Bergenlid et al.
7,127,212 B2 * 10/2006   Fattouch ...................... 455/63.1
(Continued)

FOREIGN PATENT DOCUMENTS

WO      2011056726 A1    5/2011

OTHER PUBLICATIONS

Andras Racz, et al., "On the Impact of Inter-Cell Interference in LTE" Global Telecommunications Conference, 2008. IEEE Globecom 2008. IEEE, IEEE, Piscataway, NJ, USA, Nov. 30, 2008, pp. 1-6, XP031370721 ISBN: 978-1-4244-2324-8 figure 1.

(Continued)

*Primary Examiner* — Melvin Marcelo
*Assistant Examiner* — Peter Solinsky
(74) *Attorney, Agent, or Firm* — Norton Rose Fulbright US LLP

(57) ABSTRACT

Systems and methods providing uplink coordinated multipoint (CoMP) communication are shown. A second cell may identify at least one first UE communicating with a first cell and capable of causing high uplink interference to the second cell. The second cell may estimate uplink interference from the at least one first UE at the second cell. The second cell may estimate uplink interference on specific resources. For example, the second cell may determine resources assigned to the at least one first UE for data transmission to the first cell (e.g., using pre-scheduling information provided by the first cell) and estimate uplink interference from the at least one first UE on the resources assigned to the at least one first UE. The second cell may schedule at least one second UE for uplink data transmission to the second cell based on the estimated uplink interference from the at least one first UE.

38 Claims, 9 Drawing Sheets

(51) Int. Cl.
   *H04W 72/12*      (2009.01)
   *H04W 72/14*      (2009.01)

(56) References Cited

U.S. PATENT DOCUMENTS

| | | | | |
|---|---|---|---|---|
| 7,890,115 | B2* | 2/2011 | Feng et al. | 455/450 |
| 8,116,792 | B2* | 2/2012 | Aaron | 455/501 |
| 8,295,395 | B2* | 10/2012 | Mueck et al. | 375/296 |
| 8,553,675 | B2* | 10/2013 | Yamada et al. | 370/350 |
| 8,588,801 | B2* | 11/2013 | Gorokhov et al. | 455/452.1 |
| 8,599,705 | B2* | 12/2013 | Agrawal et al. | 370/252 |
| 8,670,789 | B2* | 3/2014 | Laroia et al. | 455/458 |
| 2008/0225934 | A1* | 9/2008 | Mourad et al. | 375/227 |
| 2009/0092111 | A1* | 4/2009 | Horn et al. | 370/338 |
| 2010/0008282 | A1 | 1/2010 | Bhattad et al. | |
| 2010/0190514 | A1* | 7/2010 | Laroia et al. | 455/458 |
| 2010/0279707 | A1* | 11/2010 | Fischer et al. | 455/456.1 |
| 2011/0003567 | A1* | 1/2011 | Lee et al. | 455/127.1 |
| 2011/0105135 | A1* | 5/2011 | Krishnamurthy et al. | 455/450 |
| 2011/0117916 | A1* | 5/2011 | Dahlen | 455/436 |
| 2011/0130098 | A1* | 6/2011 | Madan et al. | 455/63.1 |
| 2011/0212739 | A1 | 9/2011 | Pedersen et al. | |
| 2011/0217985 | A1 | 9/2011 | Gorokhov | |
| 2011/0286502 | A1* | 11/2011 | Adachi et al. | 375/219 |
| 2012/0020317 | A1* | 1/2012 | Ishii et al. | 370/329 |
| 2012/0021753 | A1 | 1/2012 | Damnjanovic et al. | |
| 2012/0028644 | A1* | 2/2012 | Li | 455/436 |
| 2012/0115469 | A1* | 5/2012 | Chen et al. | 455/434 |
| 2012/0127954 | A1 | 5/2012 | Lim et al. | |
| 2012/0201226 | A1* | 8/2012 | Sambhwani et al. | 370/332 |
| 2012/0213146 | A1* | 8/2012 | Liu et al. | 370/312 |
| 2013/0044600 | A1* | 2/2013 | Sridhar et al. | 370/235 |
| 2013/0115986 | A1* | 5/2013 | Mueck et al. | 455/501 |
| 2013/0178212 | A1* | 7/2013 | Maida et al. | 455/436 |
| 2013/0260808 | A1* | 10/2013 | Chun et al. | 455/501 |
| 2013/0273930 | A1* | 10/2013 | Damnjanovic et al. | 455/452.1 |
| 2013/0336142 | A1* | 12/2013 | Dimou et al. | 370/252 |
| 2013/0343220 | A1* | 12/2013 | Chun et al. | 370/252 |
| 2014/0003273 | A1* | 1/2014 | Dimou et al. | 370/252 |
| 2014/0011489 | A1* | 1/2014 | Maida et al. | 455/418 |
| 2014/0018090 | A1* | 1/2014 | Khoryaev et al. | 455/452.1 |
| 2014/0038610 | A1* | 2/2014 | Jeong et al. | 455/436 |
| 2014/0064203 | A1* | 3/2014 | Seo et al. | 370/329 |
| 2014/0078941 | A1* | 3/2014 | Seo et al. | 370/280 |
| 2014/0086092 | A1* | 3/2014 | Chen et al. | 370/252 |
| 2014/0126523 | A1* | 5/2014 | Gunnarsson et al. | 370/329 |

OTHER PUBLICATIONS

International Search Report and Written Opinion—PCT/US2012/063882—ISA/EPO—Feb. 22, 2013.

* cited by examiner

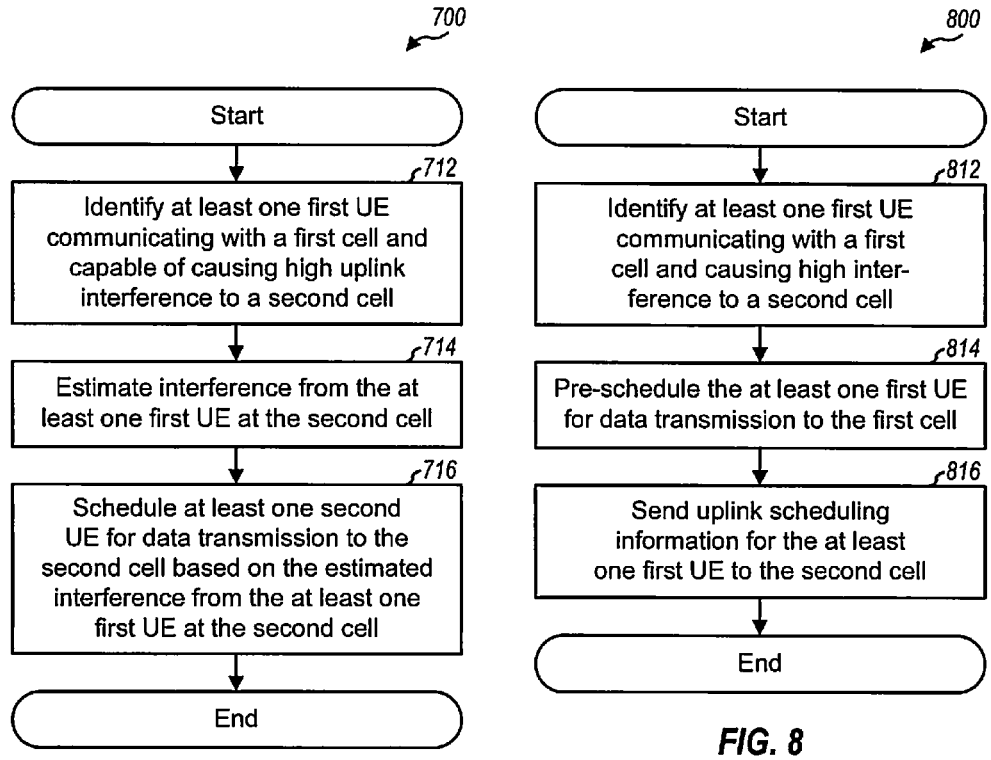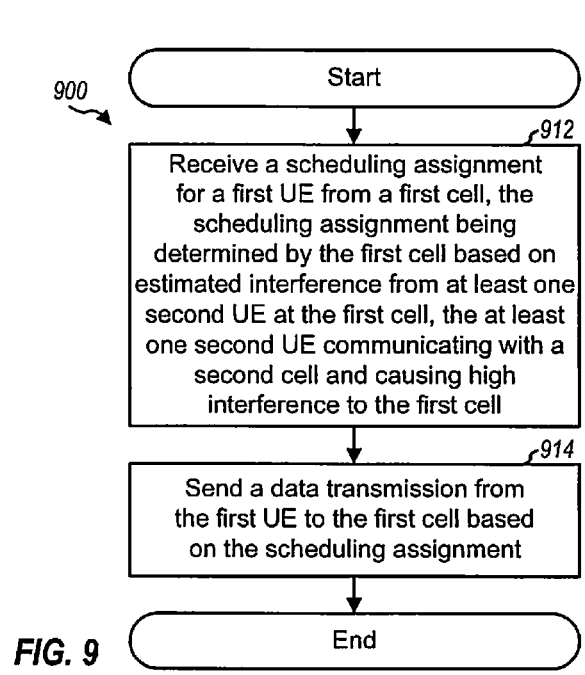

UPLINK DATA TRANSMISSION WITH INTERFERENCE MITIGATION

RELATED APPLICATIONS

The present application claims benefit of priority to U.S. provisional patent application Ser. No. 61/559,579 entitled "Uplink Data Transmission with Interference Mitigation," filed Nov. 14, 2011, the disclosure of which is incorporated herein by reference.

BACKGROUND

I. Field

The present disclosure relates generally to communication, and more specifically to techniques for supporting data transmission in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A UE may send a data transmission on the uplink to a serving base station. The data transmission from the UE may cause interference to data transmissions sent by other UEs to neighbor base stations. Correspondingly, the data transmission from the UE may also observe interference from the data transmissions sent by the other UEs. The interference may degrade performance of all affected UEs.

SUMMARY

In one aspect of the disclosure, a method for wireless communication comprises receiving, from a first cell, user equipment (UE) pilot information, the UE pilot information including information regarding pilot signal transmission by one or more UEs of a first UE group, wherein the one or more UEs of the first UE group are in communication with the first cell. The method also comprising monitoring, by a second cell, pilot signal transmission by the one or more UEs of the first UE group using information included in the UE pilot information. The method further comprising determining at least one UE of the one or more UEs of the first UE group capable of causing high uplink interference to the second cell based at least in part on the monitored pilot signal transmission. The method also comprising receiving, from the first cell, uplink pre-scheduling information for the at least one UE capable of causing high uplink interference to the second cell, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell. The method further comprising scheduling, by the second cell, one or more UE of a second UE group for uplink communication with the second cell based at least in part upon the received uplink pre-scheduling information.

In an additional aspect of the disclosure, an apparatus configured for wireless communication, comprises means for receiving, from a first cell, user equipment (UE) pilot information, the UE pilot information including information regarding pilot signal transmission by one or more UEs of a first UE group, wherein the one or more UEs of the first UE group are in communication with the first cell. The apparatus also comprising means for monitoring, by a second cell, pilot signal transmission by the one or more UEs of the first UE group using information included in the UE pilot information. The method further comprising means for determining at least one UE of the one or more UEs of the first UE group capable of causing high uplink interference to the second cell based at least in part on the monitored pilot signal transmission. The method also comprising means for receiving, from the first cell, uplink pre-scheduling information for the at least one UE capable of causing high uplink interference to the second cell, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell. The method further comprising means for scheduling, by the second cell, one or more UE of a second UE group for uplink communication with the second cell based at least in part upon the received uplink pre-scheduling information.

In an additional aspect of the disclosure, a computer program product for wireless communications in a wireless network comprises a non-transitory computer-readable medium having program code recorded thereon. The program code including program code to receive, from a first cell, user equipment (UE) pilot information, the UE pilot information including information regarding pilot signal transmission by one or more UEs of a first UE group, wherein the one or more UEs of the first UE group are in communication with the first cell. The program code also including program code to monitor, by a second cell, pilot signal transmission by the one or more UEs of the first UE group using information included in the UE pilot information. The program code further including program code to determine at least one UE of the one or more UEs of the first UE group capable of causing high uplink interference to the second cell based at least in part on the monitored pilot signal transmission. The program code further including program code to receive, from the first cell, uplink pre-scheduling information for the at least one UE capable of causing high uplink interference to the second cell, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell. The program code also including program code to schedule, by the second cell, one or more UE of a second UE group for uplink communication with the second cell based at least in part upon the received uplink pre-scheduling information.

In an additional aspect of the disclosure, an apparatus configured for wireless communication comprises at least one processor and a memory coupled to the at least one processor. The at least one processor configured to receive, from a first cell, user equipment (UE) pilot information, the UE pilot information including information regarding pilot signal transmission by one or more UEs of a first UE group, wherein the one or more UEs of the first UE group are in communication with the first cell. The at least one processor also configured to monitor, by a second cell, pilot signal transmission by the one or more UEs of the first UE group using information included in the UE pilot information. The at least one processor further configured to determine at least one UE of the one or more UEs of the first UE group capable of causing high uplink interference to the second cell based at least in part on the monitored pilot signal transmission. The at least one processor further configured to receive, from the first cell, uplink pre-scheduling information for the at least one UE capable of causing high uplink interference to the second cell, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell. The at least one processor also configured to schedule, by the second cell, one or more UE of a second UE group for uplink communication with the second cell based at least in part upon the received uplink pre-scheduling information.

In one aspect of the disclosure, a method for wireless communication, comprises transmitting, by a first cell to a second cell, user equipment (UE) pilot information, the UE pilot information including information regarding pilot signal transmission by one or more UEs of a first UE group, wherein the one or more UEs of the first UE group are in communication with the first cell. The method also comprising determining at least one UE of the one or more UEs of the first UE group capable of causing high uplink interference to the second cell. The method further comprising scheduling, by the first cell, UEs of a first UE group for uplink communication with the first cell. The method also comprising transmitting, from the first cell to the second cell, information regarding the scheduling for the at least one UE capable of causing high uplink interference as uplink pre-scheduling information, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell. The method further comprising granting the uplink traffic resource assignments to the UEs of the first UE group a time period after transmitting the uplink pre-scheduling information to accommodate scheduling, by the second cell, one or more UE of a second UE group for uplink communication with the second cell based at least in part upon the received uplink pre-scheduling information.

In an additional aspect of the disclosure, an apparatus configured for wireless communication comprising means for transmitting, by a first cell to a second cell, user equipment (UE) pilot information, the UE pilot information including information regarding pilot signal transmission by one or more UEs of a first UE group, wherein the one or more UEs of the first UE group are in communication with the first cell. The apparatus also comprising means for determining at least one UE of the one or more UEs of the first UE group capable of causing high uplink interference to the second cell. The apparatus further comprising means for scheduling, by the first cell, UEs of a first UE group for uplink communication with the first cell. The apparatus further comprising means for transmitting, from the first cell to the second cell, information regarding the scheduling for the at least one UE capable of causing high uplink interference as uplink pre-scheduling information, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell. The method also comprising means for granting the uplink traffic resource assignments to the UEs of the first UE group a time period after transmitting the uplink pre-scheduling information to accommodate scheduling, by the second cell, one or more UE of a second UE group for uplink communication with the second cell based at least in part upon the received uplink pre-scheduling information.

In an additional aspect of the disclosure, a computer program product for wireless communications in a wireless network comprises a non-transitory computer-readable medium having program code recorded thereon. The program code including program code to transmit, by a first cell to a second cell, user equipment (UE) pilot information, the UE pilot information including information regarding pilot signal transmission by one or more UEs of a first UE group, wherein the one or more UEs of the first UE group are in communication with the first cell. The program code also including program code to determine at least one UE of the one or more UEs of the first UE group capable of causing high uplink interference to the second cell. The program code further including program code to schedule, by the first cell, UEs of a first UE group for uplink communication with the first cell. The program code further including program code to transmit, from the first cell to the second cell, information regarding the scheduling for the at least one UE capable of causing high uplink interference as uplink pre-scheduling information, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell. The program code also including program code to grant the uplink traffic resource assignments to the UEs of the first UE group a time period after transmitting the uplink pre-scheduling information to accommodate scheduling, by the second cell, one or more UE of a second UE group for uplink communication with the second cell based at least in part upon the received uplink pre-scheduling information.

In an additional aspect of the disclosure, an apparatus configured for wireless communication comprising at least one processor and a memory coupled to the at least one processor. The at least one processor configured to transmit, by a first cell to a second cell, user equipment (UE) pilot information, the UE pilot information including information regarding pilot signal transmission by one or more UEs of a first UE group, wherein the one or more UEs of the first UE group are in communication with the first cell. The at least one processor also configured to determine at least one UE of the one or more UEs of the first UE group capable of causing high uplink interference to the second cell. The at least one processor further configured to schedule, by the first cell, UEs of a first UE group for uplink communication with the first cell. The at least one processor further configured to transmit, from the first cell to the second cell, information regarding the scheduling for the at least one UE capable of causing high uplink interference as uplink pre-scheduling information, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell. The at least one processor also configured to grant the uplink traffic resource assignments to the UEs of the first UE group a time period after transmitting the uplink pre-scheduling information to accommodate scheduling, by the second cell, one or more UE of a second UE group for uplink communication with the second cell based at least in part upon the received uplink pre-scheduling information.

BRIEF DESCRIPTION OF THE DRAWING

FIG. 7 shows a design of a process for supporting uplink CoMP according to aspects of the present disclosure.

FIG. 8 shows a design of a process for supporting uplink CoMP according to aspects of the present disclosure.

FIG. 9 shows a design of a process for data transmission with uplink CoMP according to aspects of the present disclosure.

DETAILED DESCRIPTION

Techniques for supporting data transmission on the uplink with interference mitigation in order to improve performance are disclosed herein. These techniques may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may, for example, implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
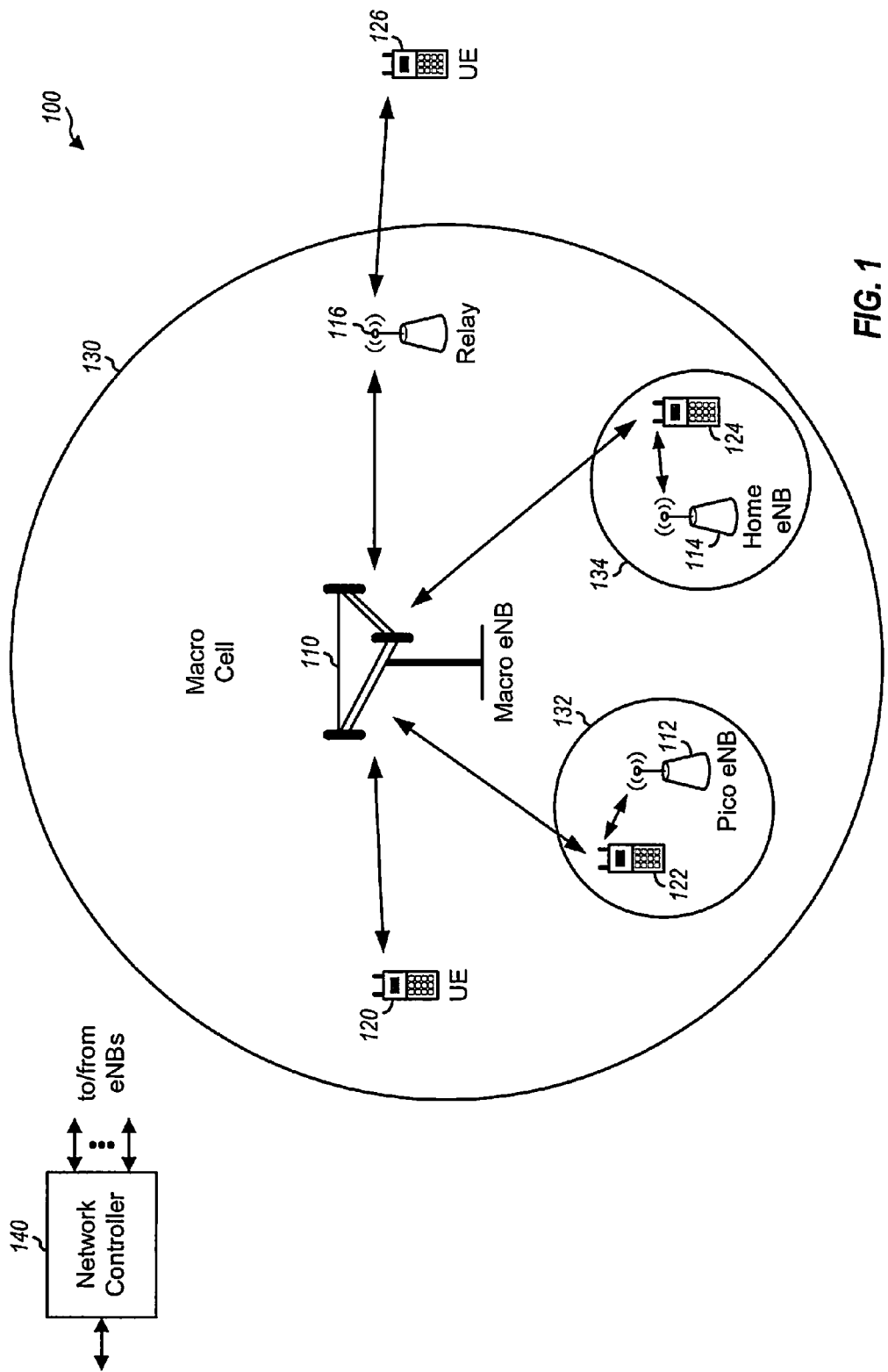
FIG. 1 is a block diagram illustrating an example of a mobile communication system.

FIG. 1 shows a wireless communication network 100, which may be an LTE network or some other wireless network. Wireless network 100 may include a number of evolved Node Bs (eNBs) 110, 112 and 114 and other network entities. An eNB may be an entity that communicates with the UEs and may also be referred to as a base station, a Node B, an access point, etc. Each eNB may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. In general, an eNB may support one or multiple (e.g., three) cells.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a home eNB (HeNB). In the example shown in FIG. 1, eNB 110 is a macro eNB for a macro cell 130, eNB 112 is a pico eNB for a pico cell 132, and eNB 114 is a home eNB for a femto cell 134. The terms "eNB", "cell", and "base station" may be used interchangeably.

Wireless network 100 may also include relays. A relay may be an entity that can receive a transmission of data from an upstream station (e.g., an eNB or a UE) and send a transmission of the data to a downstream station (e.g., a UE or an eNB). A relay may also be a UE that can relay transmissions for other UEs. In the example shown in FIG. 1, a relay 116 communicates with macro eNB 112 and a UE 126 in order to facilitate communication between eNB 110 and UE 126. A relay may also be referred to as a relay station, a relay eNB, a relay base station, etc.

Wireless network 100 may be a heterogeneous network (HetNet) that includes eNBs of different types, e.g., macro eNBs, pico eNBs, home eNBs, relays, etc. These different types of eNBs may have different transmit power levels, different coverage areas, and different impact on interference in wireless network 100. For example, macro eNBs may have a high transmit power level (e.g., 5 to 40 Watts) whereas pico eNBs, HeNBs, and relays may have lower transmit power levels (e.g., 0.1 to 2 Watts).

A network controller 140 may couple to a set of eNBs and may provide coordination and control for these eNBs. Network controller 140 may communicate with the eNBs via a backhaul. The eNBs may also communicate with one another, e.g., directly or indirectly via a wireless or wireline backhaul. For example, macro eNB 110 may communicate with pico eNB 112 and/or home eNB 114 via an X2 interface defined by 3GPP.

UEs 120 to 126 may be dispersed throughout wireless network 100, and each UE may be stationary or mobile. A UE may also be referred to as a mobile station, a terminal, an access terminal, a subscriber unit, a station, etc. A UE may be a cellular phone, a smart phone, a tablet, a wireless communication device, a personal digital assistant (PDA), a wireless modem, a handheld device, a laptop computer, a cordless phone, a wireless local loop (WLL) station, a netbook, a smartbook, etc. A UE may communicate with a serving eNB, which may be an eNB designated to serve the UE for data transmission on the downlink and/or uplink. A UE communicating with a macro eNB may be referred to as a macro UE (MUE). A UE communicating with a pico eNB may be referred to as a pico UE (PUE). A UE communicating with a home eNB may be referred to as a home eNB (HUE). In the example shown in FIG. 1, UE 120 is a MUE communicating with macro eNB 110, UE 122 is a PUE communicating with pico eNB 112, and UE 124 is a HUE communicating with home eNB 114.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, the subcarrier spacing may be 15 kilohertz (KHz), and $N_{FFT}$ may be equal to 128, 256, 512, 1024 or 2048 for system bandwidth of 1.4, 3, 5, 10 or 20 megahertz (MHz), respectively.

Figure 2:
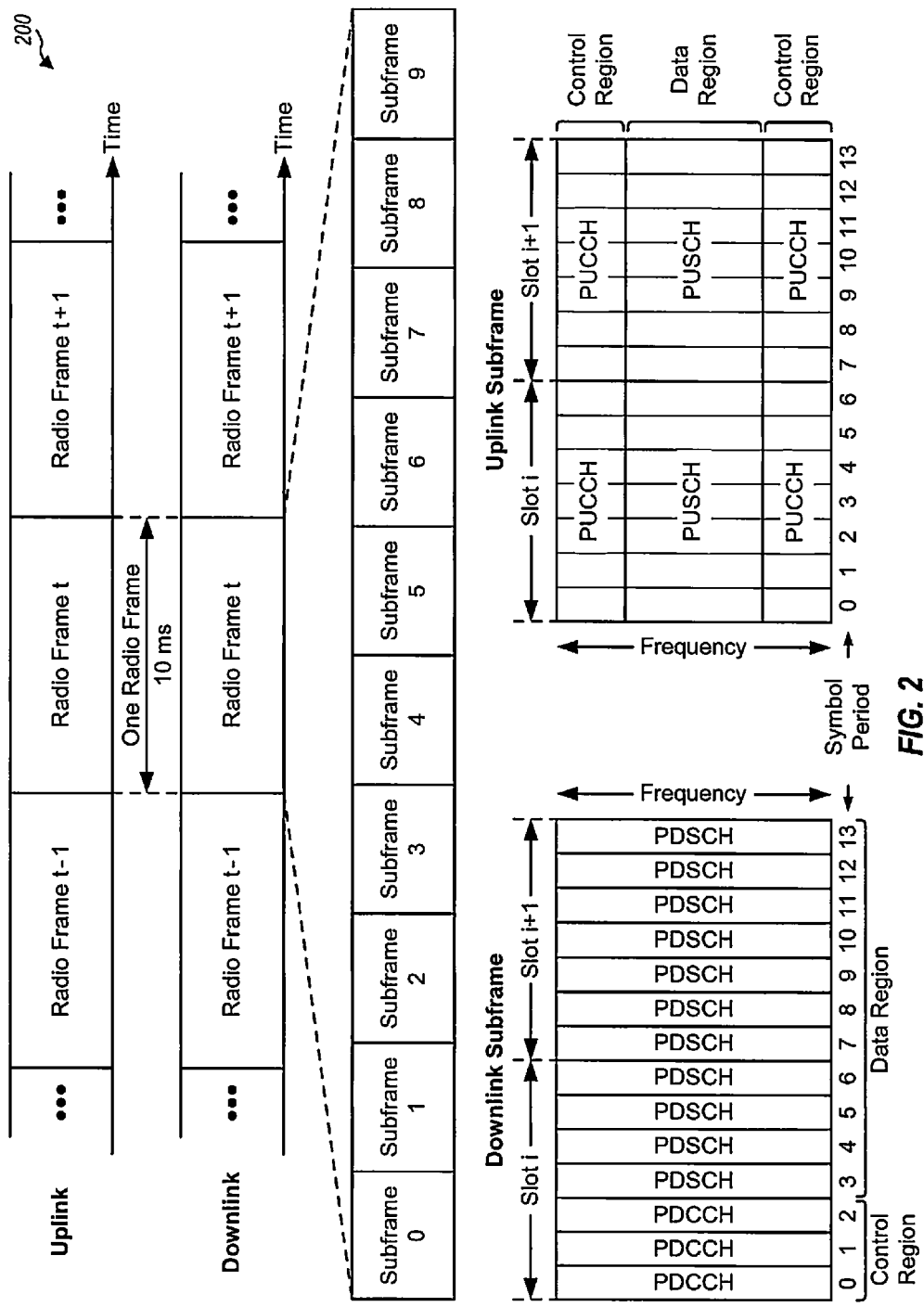
FIG. 2 is a block diagram illustrating an example of a downlink frame structure in a mobile communication system.

FIG. 2 shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into subframes, such as the 10 subframes with indices of 0 through 9 of the illustrated embodiment. Each subframe may include two slots. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1. The available time frequency resources for each of the downlink and uplink may be partitioned into resource blocks. Each resource block may cover 12 subcarriers in one slot and may include a number of resource elements. Each resource element may, for example, cover one subcarrier in one symbol period and may be used to send one modulation symbol, which may be a real or complex value.

A subframe for the downlink may include a control region and a data region, which may be time division multiplexed (TDM) as shown in FIG. 2. An eNB may send downlink control information (DCI) on a Physical Downlink Control Channel (PDCCH) in the control region to a UE. The eNB may send data and/or other information on a Physical Downlink Shared Channel (PDSCH) in the data region to the UE.

A subframe for the uplink may include a control region and a data region, which may be frequency division multiplexed (FDM) as shown in FIG. 2. A UE may send uplink control information (UCI) on a Physical Uplink Control Channel (PUCCH) in the control region to an eNB. The UE may send only data or both data and UCI on a Physical Uplink Shared Channel (PUSCH) in the data region to the eNB.

Subframe formats and channels for the downlink and uplink are described in 3GPP TS 36.211, entitled "Evolved Universal Terrestrial Radio Access (E-UTRA); Physical Channels and Modulation," which is publicly available.

In an aspect, data transmission on the uplink with interference mitigation may be supported and may be referred to as uplink coordinated multi-point (CoMP), uplink spatial coordination, etc. For uplink CoMP, a given cell may identify interfering UEs communicating with neighbor cells but causing high interference to the cell. The cell may estimate the interference due to the interfering UEs on resources (e.g., resource blocks) on which the interfering UEs are scheduled for uplink data transmission by the neighbor cells. The cell may schedule its UEs so that the interference from the interfering UEs can be mitigated. The interference mitigation may improve data transmission performance for all affected UEs.

Uplink CoMP may be used for cells of various types. For clarity, uplink CoMP is described below for an operating scenario with a single macro cell and a single pico cell. In general, uplink CoMP may be used for cells of any type and for any number of cells of each type.

Figure 3:
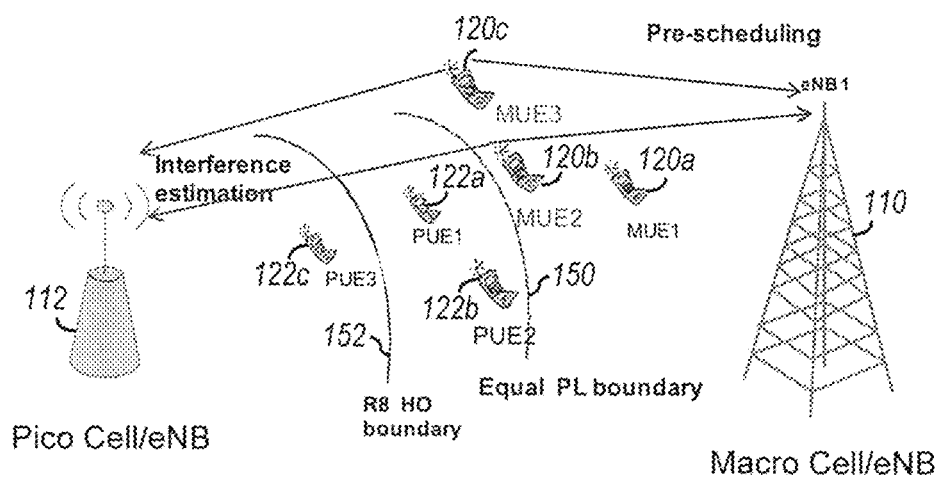
FIG. 3 is a block diagram illustrating a scenario in which a macro eNB and a pico eNB are communicating with a number of UEs.

FIG. 3 shows a scenario with macro eNB 110 and pico eNB 112 communicating with a number of UEs. Macro eNB 110 is also referred to as a macro cell, and pico eNB 112 is also referred to as a pico cell. In the example shown in FIG. 3, the macro cell communicates with three MUEs 120*a*, 120*b* and 120*c*, which are also referred to as MUE 1, MUE 2 and MUE 3, respectively. The pico cell communicates with three PUEs 122*a*, 122*b* and 122*c*, which are also referred to as PUE 1, PUE 2 and PUE 3, respectively.

The MUEs may transmit data to the macro cell when they are scheduled for data transmission on the uplink by the macro cell. The data transmissions sent by the MUEs to the macro cell may cause interference to the pico cell. Similarly, the PUEs may transmit data to the pico cell when they are scheduled for data transmission on the uplink by the pico cell. The data transmissions sent by the PUEs to the pico cell may cause interference to the macro cell. In general, a data transmission sent by a UE to its serving cell may cause interference to neighbor cells. The amount of interference caused by the UE to a given neighbor cell is dependent on the pathloss (PL) from the UE to the neighbor cell.

In FIG. 3, a line 150 represents an equal pathloss boundary, which is a boundary at which the pathloss to the macro cell is equal to the pathloss to the pico cell. UEs located close to the equal pathloss boundary may cause significant interference to neighbor cells as compared to other UEs located closer to their serving cells. For example, MUE 2 and MUE 3 are located closer to the equal pathloss boundary and generally cause much higher interference to the pico cell as compared to MUE 1. Similarly, PUE 1 and PUE 2 are located closer to the equal pathloss boundary and generally cause higher interference to the macro cell as compared to PUE 3. If the pico cell can accurately estimate the interference caused by MUE 2 and MUE 3, then the pico cell can schedule its PUEs based on the estimated interference such that performance can be improved, as described below.

Uplink CoMP may be especially desirable in a wireless network with cells of different types, e.g., as shown in FIG. 3. For example, the macro cell may have a much higher transmit power level than the pico cell. Line 152 may represent a handover boundary, which is the boundary at which the received signal quality (or received signal power) for the macro cell is equal to the received signal quality for the pico cell. Received signal quality may be given by a signal-to-noise-and-interference ratio (SINR) (as assumed in much of the description below) or some other metric. The macro cell may be selected to serve a UE (e.g., PUE 1) located between line 150 and line 152 due to the better SINR for the macro cell on the downlink. This UE may then cause high interference to the pico cell due to a smaller pathloss to the pico cell. High interference may be defined as interference exceeding a threshold. The high interference caused by this UE may be mitigated via uplink CoMP.

Figure 4A:
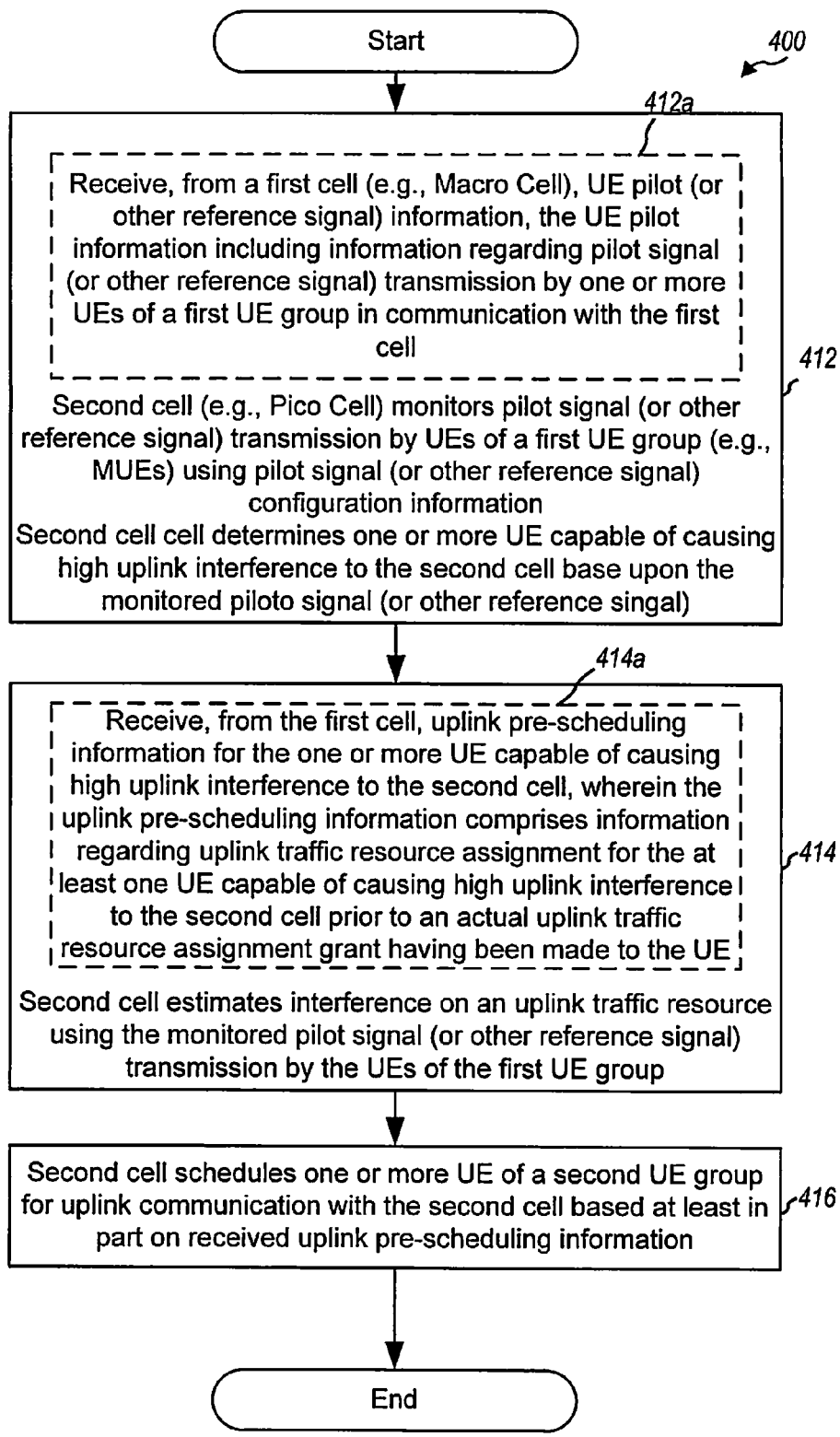
FIGS. 4A and 4B are flow diagrams showing operation of cells providing uplink coordinated multi-point (CoMP) communication according to aspects of the present disclosure.
Figure 4B:
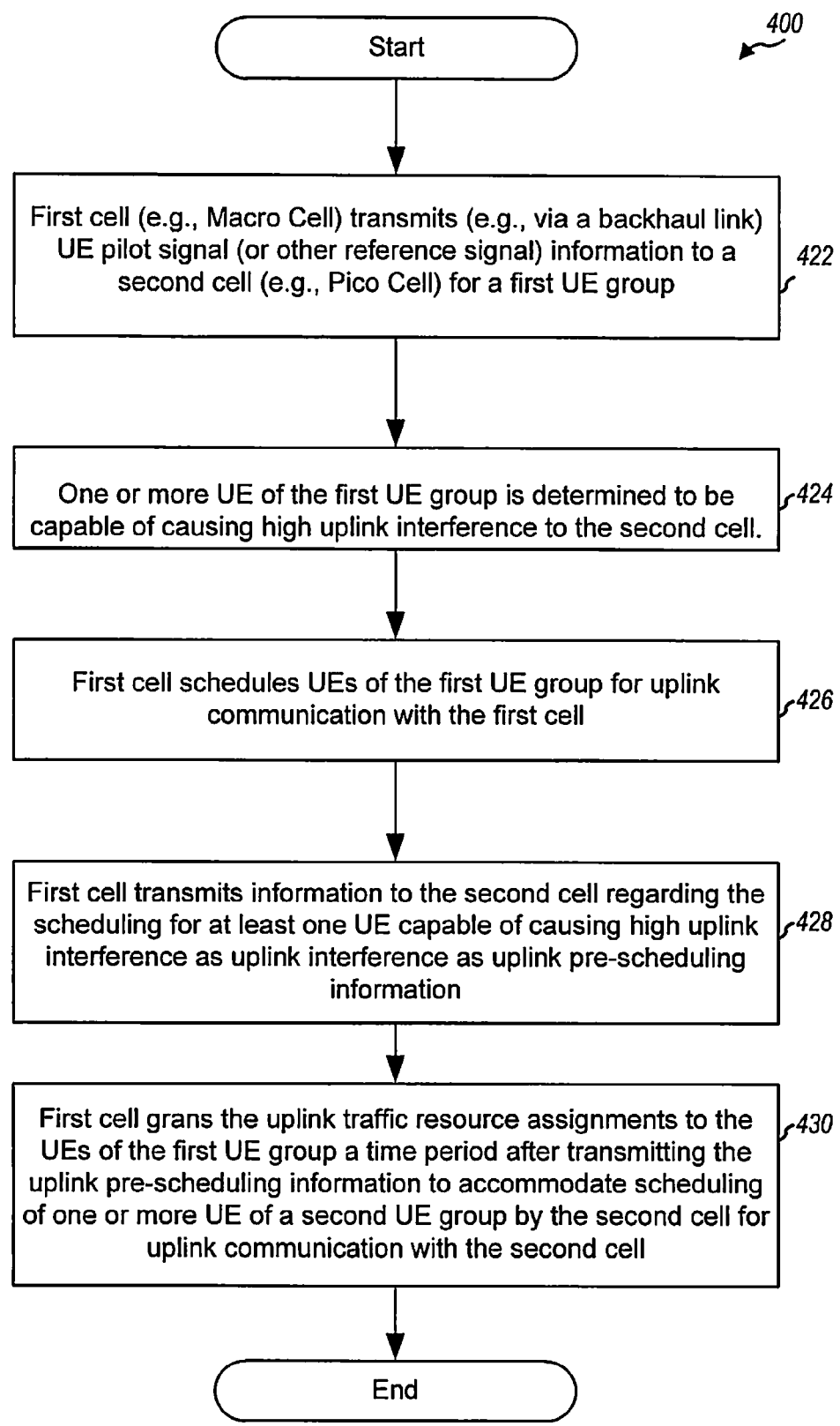

FIGS. 4A and 4B show a design of processes for supporting uplink CoMP. Processes 400 and 420 of FIGS. 4A and 4B may be performed by cells or some other entity, which may coordinate with one or more neighbor cells to support uplink CoMP. For clarity, the following description assumes that process 400 of FIG. 4A is performed by the pico cell in FIG. 3 and process 420 of FIG. 4B is performed by the macro cell in FIG. 3, wherein these cells coordinate with each other to support uplink CoMP.

The pico cell may identify one or more interfering MUEs as potentially causing high uplink interference to the pico cell (block 412). This may be achieved in various manners. In one design, the pico cell may first discover MUEs capable of causing high uplink interference to the pico cell. For example, each MUE may periodically transmit a pilot or reference signal, such as a sounding reference signal (SRS) to enable the macro cell to perform channel estimation and signal quality measurement for that MUE. The pico cell may estimate uplink interference due to each MUE based on the MUE pilot signal transmission to the macro cell as received by the pico cell. Accordingly, the pico cell may discover MUEs capable of causing high uplink interference to the pico cell based on the estimated interference due to the pilot signal from these MUEs. The discovered MUEs may be placed in a CoMP set for the pico cell.

In operation according to embodiments, information regarding the MUE pilot signal configurations is received by the pico cell from the macro cell (block 412a), such as using a backhaul communication link between the cells, for use by the pico cell in discovering MUEs capable of causing high uplink interference to the pico cell. For example, the macro cell may provide SRS configuration information for each MUE or for some subset of MUEs (e.g., MUEs disposed in areas likely to cause high uplink interference to the pico cell, MUEs exhibiting an attribute consistent with causing high uplink interference to the pico cell, MUEs identified by the macro cell as potentially interfering with uplink transmissions at the pico cell, etc.) to the pico cell for use by the pico cell in monitoring MUE SRS transmission. The pilot signal configuration information may comprise information (e.g., pilot patterns assigned to the MUEs, subframe transmission rate, MUE identification information, transmission power level, etc.) for identifying individual ones of the MUEs as a source of uplink interference by the pico cell.

The MUEs in the aforementioned CoMP set (i.e., the MUEs identified as potentially causing high uplink interference to the pico cell) may cause high interference to the pico cell only when they are scheduled for data transmission on the uplink. In one design, the macro cell may send uplink scheduling information to inform the pico cell whenever any MUE in the CoMP set is scheduled for data transmission on the uplink. The pico cell can then identify the interfering MUE(s) based on the uplink scheduling information from the macro cell. For example, the macro cell may perform pre-scheduling for the MUEs in the CoMP set and may send the pre-scheduled uplink scheduling information (referred to herein as pre-scheduling information) for the pre-scheduled MUEs to the pico cell, such as using a backhaul communication link between the cells. The pico cell may then have knowledge of the interfering MUEs before scheduling its PUEs. In operation according to embodiments, the pico cell receives the MUE pre-scheduling information (block 414a) a sufficient amount of time prior to actual data transmission by these scheduled MUEs to facilitate the pico cell estimating uplink interference due to the data transmission by the MUEs and scheduling PUE uplink transmission based upon estimated MUE interference. The pre-scheduling information may comprise information (e.g., resources, such as time frequency resources, to be assigned to particular MUEs, transmission power levels to be used by particular MUEs, MUE identification information, etc.) useful in scheduling PUEs by the pico cell.

The pico cell may estimate uplink interference due to uplink data transmission from the interfering MUE(s) (block 414). In one design, the pico cell may estimate uplink interference associated with MUE uplink data transmission using information regarding the interference at the pico cell due to the MUE's pilot signal transmission to the macro cell. Accordingly, pico cells of embodiments determine interference due to the pilot signal from potentially interfering MUEs on resources used to transmit the pilot signal (or pilot resources). The interference due to pilot signal transmission by the MUEs is determined according to embodiments to identify the MUEs of the CoMP set. Moreover, pico cells of embodiments continue to monitor such MUE pilot signal transmissions (e.g., periodically, continuously, etc.) to maintain accurate, up-to-date MUE information (e.g., MUEs may cease communication with the macro cell, MUEs may change positions relative to the pico cell, signal path conditions may change independent of the MUEs, etc.).

The pico cell may estimate interference due to data transmission from interfering MUEs on resources assigned to the respective MUE for data transmission (or data resources) based on (i) the determined interference due to the pilot signal from the MUE on the pilot signal resources and (ii) possibly additional information. The additional information may, for example, comprise a power offset between a transmit power level for the pilot signal from an interfering MUE and a transmit power level for data transmission from the MUE.

The pico cell may schedule at least one PUE based on the estimated interference due to data transmission from the interfering MUE(s) (block 416). The pico cell may perform UE selection, link adaptation, uplink multiple-input multiple-output (MIMO), or a combination thereof in providing PUE scheduling based on the estimated MUE interference. For UE selection, the pico cell may select a suitable PUE to schedule on data resources with high estimated interference from an interfering MUE. The selected PUE may be a PUE with a small pathloss to the pico cell, which may result in an acceptable SINR for the PUE at the pico cell even with high interference from the interfering MUE. For link adaptation, the pico cell may select a suitable modulation and coding scheme (MCS) for a PUE scheduled on data resources with high estimated interference from an interfering MUE. The selected MCS should enable the pico cell to reliably receive and decode data transmission from the scheduled PUE even with high interference from the interfering MUE. For uplink MIMO, a UE may perform precoding for an uplink data transmission with a precoding vector or matrix such that a large fraction of the interference is avoided via beamforming. Uplink MIMO is effectively interference avoidance in the spatial domain.

Referring now to FIG. 4B, wherein process 420 performed by the macro cell is shown, the macro cell may transmit to a pico cell (e.g., via a backhaul communication link) UE pilot or other reference signal information (block 422). The UE pilot or other reference signal information may include information regarding pilot signal or other reference signal transmission by one or more UEs of a first UE group, wherein the one or more UEs of the first UE group are in communication with the macro cell. At least one UE of the one or more UEs of the first UE group is determined to be capable of causing high uplink interference to the pico cell (424). For example, the macro cell may receive information from the pico cell regarding MUEs capable of causing high uplink interference to the pico cell, and may be determined by the pico cell monitoring pilot or other reference signal transmission by the MUEs. Such information may be used by the macro cell to determine UEs capable of causing high uplink interference to the second cell. The macro cell schedules UEs of the first UE group for uplink communication with the macro cell (block 426). The macro cell transmits (e.g., via a backhaul communication link) information to the pico cell regarding the scheduling for the UEs capable of causing high uplink interference as uplink pre-scheduling information (block 428). The uplink pre-scheduling information of embodiments comprises information regarding uplink traffic resource assignments for at least one UE capable of causing high uplink interference to the pico cell prior to an actual uplink traffic resource assignment grant having been made to the UE capable of causing high uplink interference to the pico cell. The macro cell grants the uplink traffic resource assignments to the UEs of the first UE group a time period after transmitting the uplink pre-scheduling information to accommodate scheduling, by the pico cell, one or more UE of a second UE group for uplink communication with the pico cell (e.g., based at least in part upon the received uplink pre-scheduling information) (block 430).

As can be appreciated from the foregoing, FIGS. 4A and 4B show an exemplary design of processes to support uplink CoMP by cells. Each of blocks 412, 414, and 416 of FIG. 4A and blocks 422, 424, 426, 428, and 430 of FIG. 4B may be performed in various manners. Uplink CoMP may also be supported in other manners, e.g., with different and/or additional processing steps not shown in FIGS. 4A and 4B.

Neighboring cells may cooperate and coordinate their operations in order to support uplink CoMP. An exemplary implementation of the foregoing processes is described below. For clarity, the description below is for an operating scenario with one pico cell and one macro cell, as shown in FIG. 3.

In one design, the macro cell may reserve some uplink resources that may be used for pre-scheduling UEs to support uplink CoMP. In one design, frequency division multiplexing (FDM) may be utilized, and the reserved resources may include resource blocks in a portion of the system bandwidth. The reserved resources may also include resource blocks and/or other resources selected in other manners. The macro cell may maintain a CoMP set for the pico cell. The CoMP set may include MUEs that can cause high uplink interference to the pico cell and which may be pre-scheduled to mitigate uplink interference to the pico cell. The CoMP set may be formed as described below. In one design, the macro cell may pre-schedule the MUEs in the CoMP set on the reserved resources and not on other uplink resources. The macro cell may also schedule MUEs not in the CoMP set on the reserved resources, e.g., when these resources are not used for the UEs in the CoMP set, in order to more fully utilize the resources. The macro cell may inform the pico cell of the reserved resources. The pico cell may estimate background interference in the reserved resources and may use the estimated background interference for link adaptation. In particular, the pico cell may select a suitable MCS based on an estimate of SINR, which in turn requires an estimate of interference. In another design, the macro cell may pre-schedule MUEs in the CoMP set on any uplink resources.

In one design, MUEs communicating with the macro cell may be configured to periodically transmit the SRS. The SRS may be used by the macro cell for channel estimation, signal quality measurement, and/or for other purposes. The SRS, or other appropriate signal, may also be used by the pico cell for interference estimation and/or other purposes according to the concepts herein. Each MUE may be associated with a particular SRS configuration, which may indicate how often the MUE should transmit the SRS, specific subframes in which to transmit the SRS, specific resources (e.g., resource elements) to use to transmit the SRS, transmit power level for the SRS, etc. Different MUEs may be associated with different SRS configurations and may transmit their SRS on different resources. The macro cell may inform the pico cell of the SRS configurations of all MUEs, or some subset thereof, communicating with the macro cell, such as by communicating SRS configuration information to the pico cell via a backhaul link.

In one design, the pico cell may discover UEs capable of causing high uplink interference to the pico cell. The pico cell may receive the SRS from each MUE based on the SRS configuration for that MUE. The pico cell may determine the received power of the SRS from each MUE. The pico cell may compare the received power of the SRS from each MUE against a threshold. The pico cell may identify MUEs with received SRS power exceeding the threshold as MUEs that can cause high uplink interference to the pico cell when they are scheduled for data transmission on the uplink. The pico cell may report these MUEs to the macro cell. The macro cell may include the MUEs reported by the pico cell in a CoMP set. The macro cell and/or the pico cell may maintain a CoMP set comprising the identified MUEs.

In another design, the macro cell may discover UEs capable of causing high interference to the pico cell. For example, the MUEs may detect cells based on synchronization signals and/or cell-specific reference signals (CRS) transmitted by these cells. The MUEs may measure the received power of each detected cell and may identify cells with received power exceeding a threshold. The MUEs may report the identified cells and possibly the received power of these cells to the macro cell. The macro cell may identify MUEs with high received power for the pico cell. These MUEs may have low pathloss on the downlink to the pico cell and may also have low pathloss on the uplink to the pico cell. These MUEs may be capable of causing high interference to the pico cell and may be included in the CoMP set for the pico cell.

MUEs capable of causing high interference to the pico cell may also be determined in other manners. These MUEs may be made known to the macro cell to facilitate the macro cell performing pre-scheduling for these MUEs.

Figure 6:
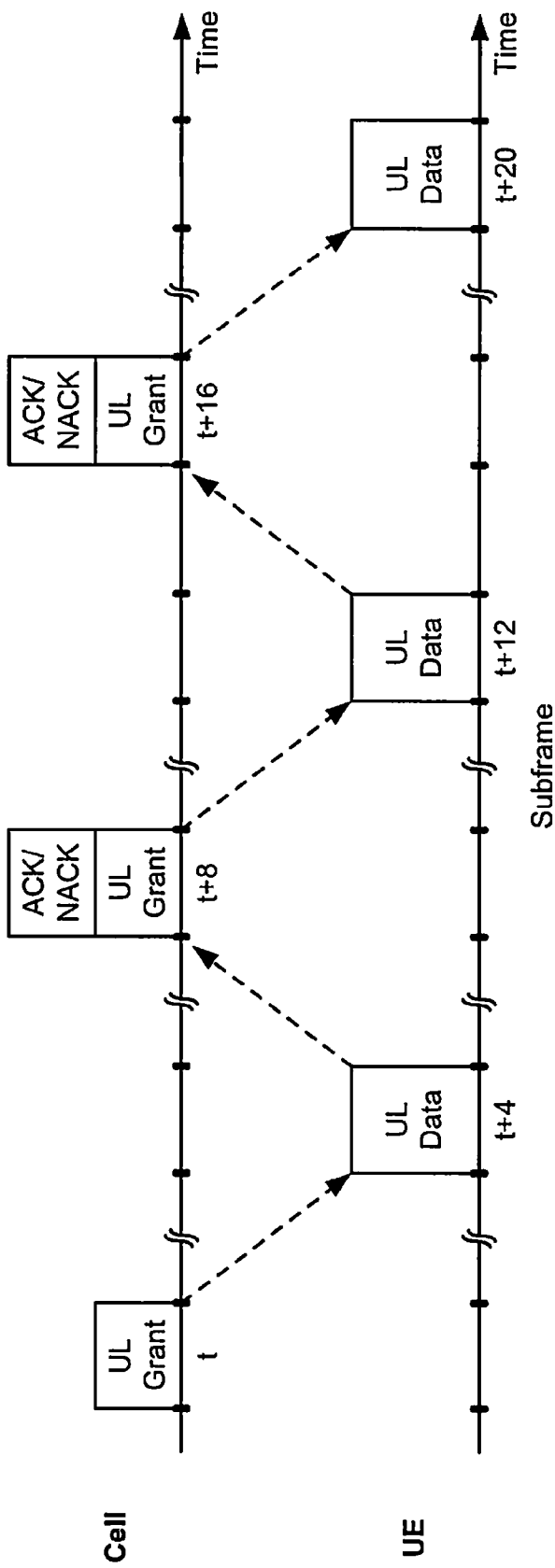
FIG. 6 shows uplink data transmission with hybrid automatic retransmission (HARQ).

In one design, the macro cell may pre-schedule MUEs in the CoMP set that can cause high interference to the pico cell. Pre-scheduling may refer to assignment/grant of resources to a UE for uplink data transmission whereas scheduling may refer transmission of the assignment/grant to the UE. Pre-scheduling and scheduling may occur at different times but may relate to the same uplink data transmission from the UE. For example, the macro cell may send an assignment/grant of resources to a MUE in subframe n for data transmission in subframe n+4, as shown in FIG. 6 below (wherein t represents n of the foregoing example). The macro cell may make a scheduling decision for the MUE (i.e., may pre-schedule the MUE for data transmission) in a previous subframe, such as subframe n−6. In this example, the MUE is pre-scheduled by 6 subframes or 6 ms. A reason for such pre-scheduling is to give some time for the pico cell to adjust its PUE uplink transmission scheduling decisions based on pre-scheduling information from the macro cell.

The macro cell may send uplink pre-scheduling information for the pre-scheduled MUEs in the CoMP set to the pico cell. The uplink pre-scheduling information may include resources that have been assigned to the pre-scheduled MUEs, power control update for the pre-scheduled MUEs, power offset between the SRS and the PUSCH for the pre-scheduled MUEs, and/or other information. The power offset may convey the difference between the transmit power level for the SRS and the transmit power level for data transmission on the PUSCH.

The pico cell may receive the uplink pre-scheduling information from the macro cell and may estimate interference due to data transmission from the pre-scheduled MUEs in the CoMP set. The pico cell may determine the pathloss for each pre-scheduled MUE based on the SRS received from that MUE, as follows:

$$PL = P_{TX,SRS} - P_{RX,SRS},\qquad \text{Eq (1)}$$

where $P_{TX,SRS}$ is the transmit power level of the SRS from the MUE, $P_{RX,SRS}$ is the received power of the SRS from the UE, and PL is the pathloss from the MUE to the pico cell.

The transmit power level of the SRS sent by each MUE may be controlled by the macro cell to maintain the SINR of the SRS within a predetermined range at the macro cell. The pico cell may determine the transmit power level of the SRS for each MUE based on the power control update for the SRS for that MUE.

The pico cell may estimate the interference due to data transmission on the PUSCH from each pre-scheduled MUE, as follows:

$$P_{INT} = P_{TX,PUSCH} - PL, \text{ and}\qquad \text{Eq (2)}$$

$$P_{TX,PUSCH} = P_{TX,SRS} + P_{OS},\qquad \text{Eq (3)}$$

where $P_{TX,PUSCH}$ is the transmit power level of the PUSCH for the MUE, $P_{OS}$ is the power offset between the SRS and the PUSCH for the MUE, and $P_{INT}$ is interference due to data transmission from the MUE at the pico cell.

As shown in equation (3), the transmit power level of the PUSCH for each pre-scheduled MUE may be determined based on the transmit power level of the SRS and the power offset between the SRS and the PUSCH for the MUE. As shown in equation (2), interference due to uplink data transmission from each pre-scheduled MUE may be estimated based on the transmit power level of the PUSCH carrying the data transmission and the pathloss for the MUE. The pico cell may assume that the interference $P_{INT}$ determined for each pre-scheduled MUE will be present on the resources assigned to the MUE for data transmission on the uplink. These resources may be conveyed by the uplink pre-scheduling information and thus known to the pico cell.

The pico cell may schedule its PUEs for uplink transmission in a manner to mitigate interference due to uplink data transmission from the pre-scheduled MUEs. In one design, the pico cell may perform UE selection and schedule appropriate PUEs on resources with high interference from the pre-scheduled MUEs. For example, the pico cell may schedule a PUE (e.g., PUE 3 in FIG. 3) located closer to the pico cell on resources with high interference. This closer PUE may have a smaller pathloss to the pico cell and a higher received power at the pico cell. Hence, this PUE may be able to achieve an acceptable SINR even with the higher interference from the pre-scheduled MUEs. The pico cell may schedule a PUE (e.g., PUE 1 in FIG. 3) located near the equal pathloss boundary on resources with less or no interference from the pre-scheduled MUEs.

Additionally or alternatively, the pico cell may implement PUE scheduling which implements link adaptation for PUEs scheduled on resources with high interference from the pre-scheduled MUEs. For example, the pico cell may estimate the SINR of each PUE based on expected received power from the PUE and expected interference from the pre-scheduled MUEs. The pico cell may select an MCS for one or more PUE based on the estimated SINR of the PUE. The pico cell may select a lower MCS for PUEs observing high interference from the pre-scheduled MUEs, which may ensure that the uplink data transmission from these PUE can be reliably received by the pico cell. The pico cell may select a higher MCS for PUEs observing less or no interference from the pre-scheduled MUEs, which may improve throughput. The pico cell may also schedule its PUEs in other manners to account for high interference from the MUEs.

Figure 5:
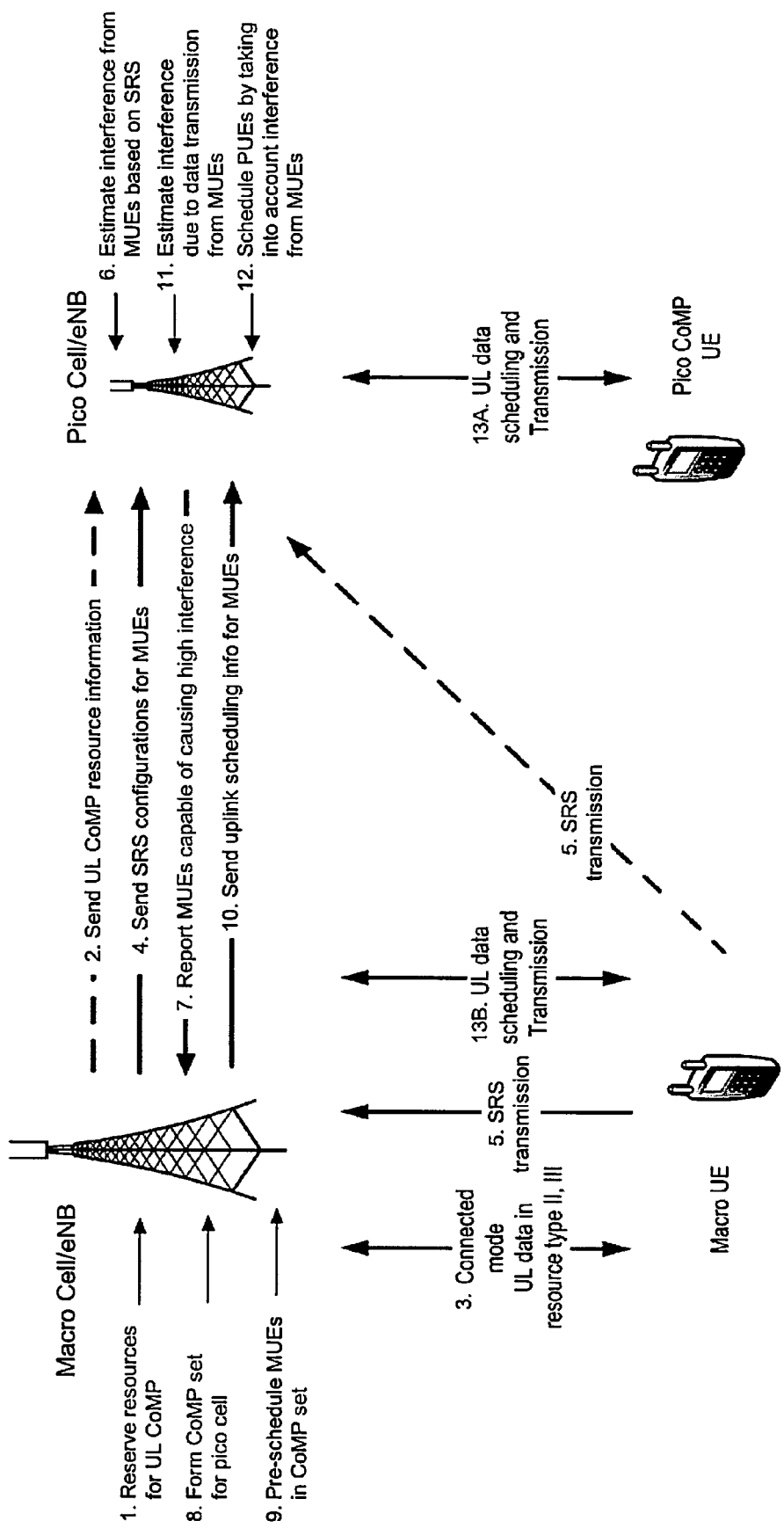
FIG. 5 shows processing performed by a pico cell and a macro cell to support uplink CoMP according to aspects of the present disclosure.

FIG. 5 shows the processing performed by the pico cell and the macro cell to support uplink CoMP according to embodiments herein. The macro cell may reserve some uplink resources to support uplink CoMP (step 1). The macro cell may send information conveying the reserved resources to the pico cell (step 2). The macro cell may configure its MUEs for transmission of SRS on the uplink (step 3). The macro cell may send information conveying the SRS configurations for the MUEs to the pico cell (step 4). The MUEs may transmit SRS based on their SRS configurations (step 5).

The pico cell may receive the SRS from the MUEs and may determine interference at the pico cell due to the SRS from the MUEs (step 6). The pico cell may discover MUEs capable of causing high uplink interference to the pico cell based on the interference due to the SRS from the MUEs (also step 6). For example, a MUE with interference due to the SRS exceeding a threshold may be deemed as a MUE capable of causing high uplink interference to the pico cell. The pico cell may report discovered MUEs to the macro cell (step 7). A CoMP set comprising the MUEs capable of causing high uplink interference may be formed for the pico cell (step 8).

The macro cell may pre-schedule one or more MUEs in the CoMP set for uplink data transmission (step 9). The macro cell may send uplink pre-scheduling information for the pre-scheduled MUE(s) to the pico cell (step 10). The uplink pre-scheduling information may convey various parameters for uplink data transmission by the pre-scheduled MUE(s), as described above. The pico cell may estimate interference due to uplink data transmission from the pre-scheduled MUE(s) based on the uplink pre-scheduling information and the interference due to the SRS from the MUE(s), as described above (step 11). The pico cell may schedule one or more PUEs in a manner to mitigate the interference from the pre-scheduled MUE(s), e.g., with UE selection, link adaptation, etc. (step 12). The pico cell may send an uplink grant to each scheduled PUE (step 13A). Each scheduled PUE may send data transmission on the uplink in accordance with the uplink grant received from the pico cell (also step 13A). Similarly, the macro cell may send an uplink grant to each pre-scheduled MUE (step 13B), wherein the uplink grants are in accordance with the pre-scheduling information. Each pre/scheduled MUE may send data transmission on the uplink in accordance with the uplink grant received from the macro cell (also step 13B). The scheduled MUE(s) and the scheduled PUE(s) may send their data transmissions in the same subframe and on the same or different resource blocks. The uplink data transmission from the PUE(s) should achieve good performance since the interference from the MUE(s) has been accounted for by the pico cell.

As shown in FIG. 5, the macro cell and the pico cell may exchange messages via the backhaul (e.g., an X2 interface) to support uplink CoMP. The pre-scheduling implemented according to embodiments should not only be provided in sufficient time in advance of scheduling grants to accommodate interference estimation and PUE scheduling by the pico cell, but should also account for delay in exchanging messages via the backhaul. In particular, the macro cell should perform pre-scheduling and send uplink scheduling information sufficiently early to account for communication delay (e.g., the X2 delay) between the macro cell and the pico cell.

Wireless network 100 may support data transmission with hybrid automatic retransmission (HARQ) in order to improve reliability. For HARQ, a transmitter may send an initial transmission of a packet of data and may send one or more retransmissions of the packet, if needed, until the packet is decoded correctly by a receiver, or the maximum number of retransmissions of the packet has occurred, or some other termination condition is encountered. A packet may also be referred to as a transport block, a codeword, a data block, etc. After each transmission or retransmission of the packet, the receiver may decode all received re/transmissions of the packet to attempt to recover the packet and may send an acknowledgement (ACK) if the packet is decoded correctly or a negative acknowledgement (NACK) if the packet is decoded in error. The transmitter may send another retransmission of the packet if a NACK is received and may terminate transmission of the packet if an ACK is received. The transmitter may process (e.g., encode and modulate) the packet based on a MCS selected such that the packet can be decoded correctly with high probability after a target number of transmissions of the packet, which may be referred to as a target termination.

FIG. 6 shows uplink data transmission with HARQ. A UE may have data to send to a serving cell and may send a scheduling request on the PUCCH (not shown in FIG. 6). The cell may receive the scheduling request from the UE and may schedule the UE for data transmission on the uplink. The cell may generate an uplink grant comprising various parameters for the uplink data transmission and may send the uplink grant to the UE in subframe t.

The UE may receive the uplink grant from the cell, process data based on the uplink grant, and send a data transmission on assigned resources in subframe t+4. The cell may receive and decode the data transmission from the UE and may send an ACK in subframe t+8 if the data transmission is decoded correctly or a NACK if the data transmission is decoded in error. The cell may also send an uplink grant in subframe t+8 for a retransmission by the UE if the data is decoded in error by the cell. The UE may receive the uplink grant from the cell and may send a retransmission of the data on assigned resources in subframe t+12. The cell may receive and decode the initial transmission and the retransmission from the UE and may send an ACK or a NACK in subframe t+16. Retransmission and ACK/NACK feedback may continue in similar manner until the data is decoded correctly by the cell.

FIG. 6 shows a 8-ms HARQ timeline for data transmission on the uplink. In particular, the UE may send transmission and retransmissions in subframes spaced apart by 8 subframes or 8 ms. Data transmission with HARQ may also be supported with a longer or shorter HARQ timeline.

Uplink CoMP may be impacted by uplink data transmission with HARQ. The cell in FIG. 6 may be the macro cell in FIGS. 3 and 5, and the UE may be a MUE. The macro cell may pre-schedule the MUE for the initial data transmission in subframe t+4 and may send uplink pre-scheduling information for the MUE to the pico cell. However, the macro cell may not know whether to schedule the MUE for retransmission in subframe t+12 until after the macro cell has decoded the data transmission received in subframe t+4. There may be insufficient time to pre-schedule the macro cell for retransmission in subframe t+12.

Retransmissions of the MUE may be handled in various manners to support uplink CoMP. In one design, retransmissions of the MUE may be scheduled on uplink resources not used for uplink CoMP. In this case, the retransmissions of the MUE would not cause high uplink interference to the pico cell, and pre-scheduling of the MUE may be skipped. In another design, a longer HARQ timeline may be used for the MUE to enable pre-scheduling of the MUE for each retransmission. For example, a 16-ms HARQ timeline may be used for the MUE, odd-numbered retransmissions 1, 3, 5, etc. may be suspended, and even-numbered retransmissions may be pre-scheduled for the MUE. Uplink scheduling information for each retransmission may be sent to the pico cell. For example, in FIG. 6, if the data transmission in subframe t+4 is decoded in error, then the macro cell may pre-scheduled the MUE for data transmission in subframe t+20 and may send uplink scheduling information for the MUE to the pico cell. Extending the HARQ timeline may ensure that there is sufficient time for pre-scheduling to support uplink CoMP.

The MUEs may transmit SRS, which may be used by the macro cell for channel estimation and signal quality measurement and also by the pico cell for interference estimation, as described above. Each MUE may transmit the SRS at a transmit power level that may be controlled by the macro cell, e.g., to maintain the SINR or received power of the SRS within a desired range at the macro cell. Varying the transmit power level of the SRS by the macro cell may impact interference estimation based on the SRS by the pico cell. The macro cell may send to the pico cell information conveying the transmit power level of the SRS for each MUE and/or other information useful to the pico cell for monitoring the SRS and determining the associated interference at the pico cell.

In another design, a reference signal may be used to support interference estimation by neighbor cells for uplink CoMP and may be referred to as a CoMP SRS. A UE may be configured to periodically or aperiodically transmit the CoMP SRS in order to aid channel and/or interference estimation by neighbor cells. The UE may be assigned a CoMP SRS configuration that is specific to the UE. The CoMP SRS configuration may be conveyed to the UE via upper layer signaling (e.g., RRC) in similar manner as for a SRS configuration. The UE may transmit the CoMP SRS in addition to the SRS used by the serving cell for channel estimation and signal quality measurement. However, the CoMP SRS configuration and the SRS configuration for the UE should not conflict, so that the CoMP SRS and the SRS are not transmitted on the same resources. In one design, the transmit power level of the CoMP SRS may be varied based on received power or SINR of the CoMP SRS at one or more neighbor cells. A neighbor cell may measure the received power or SINR of the CoMP SRS from the UE and may report the received power or SINR to the serving cell. The serving cell may adjust the transmit power level of the CoMP SRS based on the reported received power or SINR at the neighbor cell.

FIG. 7 shows a design of a process 700 for supporting uplink CoMP. Process 700 may be performed by a second cell (e.g., a pico cell) coordinating with a first cell (e.g., a macro cell) for uplink CoMP.

The second cell may identify at least one first UE (e.g., MUE) communicating with the first cell and capable of causing high uplink interference to the second cell (block 712). The second cell may estimate uplink interference from the at least one first UE at the second cell (block 714). The second cell may estimate uplink interference on specific resources. For example, the second cell may (i) determine resources assigned to the at least one first UE for data transmission to the first cell (e.g., using pre-scheduling information provided by the first cell) and (ii) estimate uplink interference from the at least one first UE on the resources assigned to the at least one first UE. The second cell may schedule at least one second UE (e.g., PUE) for uplink data transmission to the second cell based on the estimated uplink interference from the at least one first UE (block 716).

In one design, the second cell may discover first UEs communicating with the first cell and capable of causing high interference to the second cell. The second cell may first determine a plurality of first UEs communicating with the first cell. For example, the second cell may receive reference signal configurations for the plurality of first UEs. The second cell may estimate interference due to the reference signal from each of the plurality of first UEs based on the reference signal configuration for each first UE. The second cell may determine one or more first UEs in the plurality of first UEs with estimated interference exceeding a threshold. The second cell may report the one or more first UEs to the first cell. The first cell may inform the second cell whenever any one of the one or more UEs is scheduled for data transmission on the uplink. The at least one first UE may be among the one or more first UEs.

In one design of block 712, the second cell may receive uplink pre-scheduling information indicating the at least one first UE being scheduled for data transmission to the first cell. The uplink pre-scheduling information may comprise an identity of each of the at least one first UE, resources assigned to each of the at least one first UE, information related to transmit power of each of the at least one first UE, etc., and/or combinations thereof. The second cell may identify the at least one first UE based on the uplink scheduling information.

In one design of block 714, the second cell may determine interference due to a reference signal from each of the at least one first UE. The second cell may then estimate interference due to uplink data transmission from each of the at least one first UE based on (i) the interference due to the reference signal from each first UE and (ii) information related to transmit power of each first UE, e.g., as shown in equations (2) and (3).

In one design of block 716, the second cell may perform UE selection and may select the at least one second UE from among a plurality of second UEs based on the estimated interference from the at least one first UE. The second cell may select the at least one second UE based further on path-loss between each second UE and the second cell. Additionally or alternatively, the second cell may perform link adaptation and may select at least one modulation and coding scheme for the at least one second UE based on the estimated interference from the at least one first UE. The second cell may also schedule the at least one second UE in other manners to account for the high interference from the at least one first UE.

In one design, the second cell may receive information indicating resources reserved for a set of first UEs communicating with the first cell and capable of causing high interference to the second cell. In one design, for HARQ, initial transmissions of data from the at least one first UE may be scheduled on the reserved resources, and retransmissions of data from the at least one first UE may not be scheduled on the reserved resources. In this design, pre-scheduling of retransmissions of data from the at least one first UE may be skipped. In another design, transmissions and retransmissions of data from the at least one first UE may be scheduled based on a first HARQ timeline, and transmissions and retransmissions of data from the at least one second UE may be scheduled based on a second HARQ timeline, which may be shorter than the first HARQ timeline. This design may ensure sufficient time for pre-scheduling both transmissions and retransmissions of data from the at least one first UE.

In one design, the reference signal from each first UE may comprise a SRS used by the first cell for channel estimation, or signal quality measurement, etc. The reference signal may also comprise other types of reference signal. In one design, the reference signal from each first UE may be associated with a transmit power level that may be adjusted based on measurements of the reference signal by the first cell. In another design, the transmit power level of the reference signal (e.g., a CoMP SRS) may be adjusted based on measurements of the reference signal by the second cell.

FIG. 8 shows a design of a process 800 for supporting uplink CoMP. Process 800 may be performed by a first cell (e.g., a macro cell) coordinating with a second cell (e.g., a pico cell) for uplink CoMP.

The first cell may identify at least one first UE (e.g., MUE) communicating with the first cell and capable of causing high uplink interference to the second cell (block 812). The first cell may pre-schedule the at least one first UE for data transmission to the first cell (block 814). The first cell may send uplink pre-scheduling information for the at least one first UE to the second cell to facilitate the second cell mitigating high uplink interference from the at least one first UE (block 816).

In one design, the second cell may discover first UEs communicating with the first cell and capable of causing high uplink interference to the second cell. The first cell may send to the second cell reference signal configurations for a plurality of first UEs communicating with the first cell. The second cell may use the reference signal configurations to determine interference from the plurality of first UEs at the second cell. The first cell may receive from the second cell information indicating one or more first UEs communicating with the first cell and capable of causing high uplink interference to the second cell. The first cell may include the one or more first UEs in a set of first UEs maintained for the second cell. The first cell may perform pre-scheduling for the first UEs in this set and may send uplink pre-scheduling information for pre-scheduled first UEs to the second cell.

In one design, the first cell may send to the second cell information indicating resources reserved for the set of first UEs communicating with the first cell and capable of causing high interference to the second cell. In one design, for HARQ, the first cell may schedule initial transmissions of data from the at least one first UE on the reserved resources and may schedule retransmissions of data from the at least one first UE on resources different than the reserved resources. In another design, the first cell may schedule transmissions and retransmissions of data from the at least one first UE based on a first HARQ timeline. The second cell may schedule transmissions and retransmissions of data from the at least one second UE based on a second HARQ timeline, which may be shorter than the first HARQ timeline.

FIG. 9 shows a design of a process 900 for data transmission with uplink CoMP. Process 900 may be performed by a first UE (e.g., a PUE) communicating with a first cell (e.g., a pico cell) with uplink CoMP. The first UE may receive a scheduling assignment from the first cell (block 912). The scheduling assignment may be determined by the first cell based on estimated interference from at least one second UE (e.g., MUE) at the first cell. The at least one second UE may communicate with a second cell (e.g., a macro cell) and may cause high uplink interference to the first cell. The first cell may estimate interference from the at least one second UE on resources assigned to the at least one second UE for data transmission to the second cell. The first cell may schedule the first UE based on the estimated interference from the at least one second UE on the resources assigned to the at least one second UE. The first UE may send a data transmission to the first cell based on the scheduling assignment (block 914).

Although examples are given above with reference to the use of SRS transmission by the MUEs, it should be appreciated that the concepts herein are not limited to the use of such signals. Embodiments herein may utilize any suitable MUE transmission for identifying MUEs capable of causing high uplink interference, such as channel quality information (CQI) transmission, demodulation reference signal (DMRS) transmission, physical uplink control channel (PUCCH) transmission, or other predictable signal (e.g., configured to occur having a certain pattern that the pico cell can identify and match).

Figure 10:
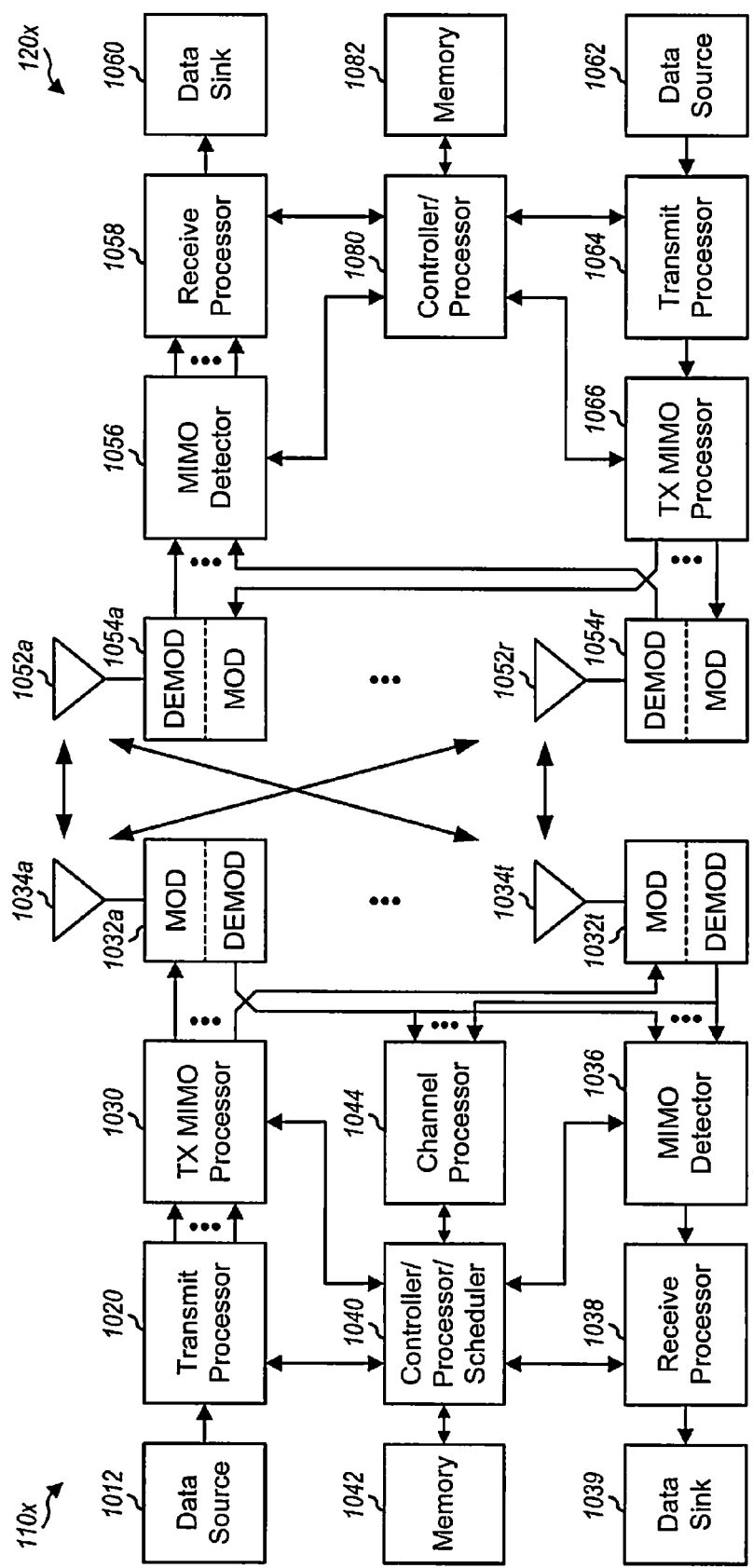
FIG. 10 is a block diagram illustrating a design of a base station/eNB and a UE configured according to one aspect of the present disclosure.

FIG. 10 shows a block diagram of a design of a base station/eNB 110x and a UE 120x, which may be one of the base stations/eNBs and one of the UEs in FIG. 1. Base station 110x may serve one or more cells and may be equipped with T antennas 1034a through 1034t, where in general T≥1. UE 120x may be equipped with R antennas 1052a through 1052r, where in general R≥1.

At base station 110x, a transmit processor 1020 may receive data from a data source 1012 for one or more UEs scheduled for data transmission on the downlink, process (e.g., encode and modulate) the data for each scheduled UE based on one or more modulation and coding schemes selected for that UE, and provide data symbols for all UEs. Transmit processor 1020 may also process control information (e.g., for scheduling grants, configuration messages, etc.) and provide control symbols. Processor 1020 may also generate reference symbols for reference signals. A transmit (TX) MIMO processor 1030 may precode the data symbols, the control symbols, and/or the reference symbols (if applicable) and may provide T output symbol streams to T modulators (MOD) 1032a through 1032t. Each modulator 1032 may process its output symbol stream (e.g., for OFDM, etc.) to obtain an output sample stream. Each modulator 1032 may further condition (e.g., convert to analog, amplify, filter, and upconvert) its output sample stream to obtain a downlink signal. T downlink signals from modulators 1032a through 1032t may be transmitted via T antennas 1034a through 1034t, respectively.

At UE 120x, antennas 1052a through 1052r may receive the downlink signals from base station 110x and/or other base stations and may provide received signals to demodulators (DEMODs) 1054a through 1054r, respectively. Each demodulator 1054 may condition (e.g., filter, amplify, downconvert, and digitize) it's received signal to obtain input samples. Each demodulator 1054 may further process the input samples (e.g., for OFDM, etc.) to obtain received symbols. A MIMO detector 1056 may obtain received symbols from all R demodulators 1054a through 1054r, perform MIMO detection on the received symbols, and provide detected symbols. A receive processor 1058 may process (e.g., demodulate and decode) the detected symbols, provide decoded data for UE 120x to a data sink 1060, and provide decoded control information to a controller/processor 1080.

On the uplink, at UE 120x, a transmit processor 1064 may receive and process data from a data source 1062 and control information from controller/processor 1080. Processor 1064 may also generate reference symbols for one or more reference signals such as SRS, CoMP SRS, etc. The symbols from transmit processor 1064 may be precoded by a TX MIMO processor 1066 if applicable, further processed by modulators 1054a through 1054r (e.g., for SC-FDM, OFDM, etc.), and transmitted to base station 110x and other base stations. At base station 110x, the uplink signals from UE 120x and other UEs may be received by antennas 1034, processed by demodulators 1032, detected by a MIMO detector 1036 if applicable, and further processed by a receive processor 1038 to obtain decoded data and control information sent by UE 120x and other UEs. Processor 1038 may provide the decoded data to a data sink 1039 and the decoded control information to controller/processor 1040. A channel processor 1044 may estimate interference from UEs not served by base station 110x and may measure received signal quality of UEs served by base station 110x, e.g., based on the SRS and/or CoMP SRS received from these UEs.

Controllers/processors 1040 and 1080 may direct the operation at base station 110x and UE 120x, respectively. Processor 1040 and/or other processors and modules at base station 110x may perform or direct process 700 in FIG. 7, process 800 in FIG. 8, and/or other processes for the techniques described herein. Processor 1080 and/or other processors and modules at UE 120x may perform or direct process 900 in FIG. 9 and/or other processes for the techniques described herein. Memories 1042 and 1082 may store data and program codes for base station 110x and UE 120x, respectively. Scheduler 1040 may schedule UEs for data transmission on the downlink and/or uplink.

In one configuration, apparatus 110x for wireless communication may include means for identifying at least one first UE communicating with a first cell and causing high interference to a second cell, means for estimating interference from the at least one first UE at the second cell, and means for scheduling at least one second UE for data transmission to the second cell based on the estimated interference from the at least one first UE at the second cell.

In another configuration, apparatus 110x for wireless communication may include means for identifying at least one first UE communicating with a first cell and causing high interference to a second cell, means for pre-scheduling the at least one first UE for data transmission to the first cell, and means for sending uplink scheduling information for the at least one first UE to the second cell.

In yet another configuration, apparatus 120x for wireless communication may include means for receiving a scheduling assignment for a first UE from a first cell, the scheduling assignment being determined by the first cell based on estimated interference from at least one second UE at the first cell, the at least one second UE communicating with a second cell and causing high interference to the first cell, and means for sending a data transmission from the first UE to the first cell based on the scheduling assignment.

In an aspect, the aforementioned means may be processor(s) 1020, 1038 and/or 1040 at base station 110x and/or processors(s) 1058, 1064 and/or 1080 at UE 120x, which may be configured to perform the functions recited by the aforementioned means. In another aspect, the aforementioned means may be one or more modules or any apparatus configured to perform the functions recited by the aforementioned means.

Additional details of the techniques described herein are given in the attached Appendix A, which is part of the present disclosure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving, from a first cell, user equipment (UE) pilot information, the UE pilot information including information regarding pilot signal transmission by one or more UEs of a first UE group, wherein the one or more UEs of the first UE group are in communication with the first cell;
monitoring, by a second cell, pilot signal transmission by the one or more UEs of the first UE group using information included in the UE pilot information;
determining at least one UE of the one or more UEs of the first UE group capable of causing high uplink interference to the second cell based at least in part on the monitored pilot signal transmission;
receiving, from the first cell, uplink pre-scheduling information for the at least one UE capable of causing high uplink interference to the second cell, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell; and
scheduling, by the second cell, one or more UE of a second UE group for uplink communication with the second cell based at least in part upon the received uplink pre-scheduling information.

2. The method of claim 1, further comprising:
estimating interference on an uplink traffic resource of the second cell using the monitored pilot signal transmission by the one or more UEs of the first UE group, wherein the scheduling one or more UE of the second UE group for uplink communication is based at least in part upon the estimated uplink traffic resource interference.

3. The method of claim 2, wherein the estimating uplink traffic resource interference at the second cell comprises:
estimating interference due to data transmission from each UE of the one or more UEs of the first UE group based on interference on the uplink traffic resource estimated from the monitored pilot signal transmissions.

4. The method of claim 3, wherein the estimating uplink traffic resource interference at the second cell further comprises:
using a power offset between a transmit power level for the monitored pilot signal transmission and a transmit power level for data transmission in the uplink traffic resource by the at least one UE to estimate the interference due to data transmission.

5. The method of claim 4, further comprising:
receiving, from the first cell, transmit power level information for the one or more UEs of the first UE group; and
determining the power offset using the transmit power level information.

6. The method of claim 2, wherein the scheduling one or more UE of the second UE group for uplink communication with the second cell comprises:
selecting a particular UE of the second UE group for uplink communication in a resource in which a UE of the at least one UE estimated to cause high interference to the second cell is expected to cause the high interference, wherein the particular UE of the second UE group is selected based at least in part on the estimated interference.

7. The method of claim 2, wherein the scheduling one or more UE of the second UE group for uplink communication with the second cell comprises:
selecting a modulation and coding scheme with respect to an uplink between the second cell and a particular UE of the second UE group, wherein the modulation and coding scheme is selected based at least in part on the estimated interference.

8. The method of claim 2, wherein the scheduling one or more UE of the second UE group for uplink communication with the second cell comprises:
avoiding scheduling at least one UE of the second UE group for uplink communication in a resource in which a UE of the at least one UE estimated to cause high interference to the second cell is expected to cause the high interference.

9. The method of claim 1, wherein the uplink pre-scheduling information comprises an identity of each UE of the one or more UEs of the first UE group, wherein the identity information is used by the second cell to identify the at least one UE estimated to cause high interference to the second cell.

10. The method of claim 1, wherein the uplink pre-scheduling information comprises information related to transmit power of the at least one UE estimated to cause high interference to the second cell.

11. The method of claim 1, further comprising:
reserving uplink traffic resources for repeat request transmission by the at least one UE estimated to cause high interference to the second cell, wherein the reserved uplink traffic resource is not used by the second cell for UEs of the second UE group.

12. The method of claim 1, further comprising:
implementing an extended repeat request transmission timeline to preschedule the at least one UE estimated to cause high interference to the second cell for retransmission.

13. An apparatus configured for wireless communication, comprising:
means for receiving, from a first cell, user equipment (UE) pilot information, the UE pilot information including information regarding pilot signal transmission by one or more UEs of a first UE group, wherein the one or more UEs of the first UE group are in communication with the first cell;
means for monitoring, by a second cell, pilot signal transmission by the one or more UEs of the first UE group using information included in the UE pilot information;
means for determining at least one UE of the one or more UEs of the first UE group capable of causing high uplink interference to the second cell based at least in part on the monitored pilot signal transmission;
means for receiving, from the first cell, uplink pre-scheduling information for the at least one UE capable of causing high uplink interference to the second cell, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell; and
means for scheduling, by the second cell, one or more UE of a second UE group for uplink communication with the second cell based at least in part upon the received uplink pre-scheduling information.

14. A computer program product for wireless communications in a wireless network, comprising:
a non-transitory computer-readable medium having program code recorded thereon, the program code including:
program code to receive, from a first cell, user equipment (UE) pilot information, the UE pilot information including information regarding pilot signal transmission by one or more UEs of a first UE group, wherein the one or more UEs of the first UE group are in communication with the first cell;
program code to monitor, by a second cell, pilot signal transmission by the one or more UEs of the first UE group using information included in the UE pilot information;
program code to determine at least one UE of the one or more UEs of the first UE group capable of causing high uplink interference to the second cell based at least in part on the monitored pilot signal transmission;
program code to receive, from the first cell, uplink pre-scheduling information for the at least one UE capable of causing high uplink interference to the second cell, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell; and
program code to schedule, by the second cell, one or more UE of a second UE group for uplink communication with the second cell based at least in part upon the received uplink pre-scheduling information.

15. An apparatus configured for wireless communication, the apparatus comprising:
    at least one processor; and
    a memory coupled to the at least one processor,
    wherein the at least one processor is configured:
        to receive, from a first cell, user equipment (UE) pilot information, the UE pilot information including information regarding pilot signal transmission by one or more UEs of a first UE group, wherein the one or more UEs of the first UE group are in communication with the first cell;
        to monitor, by a second cell, pilot signal transmission by the one or more UEs of the first UE group using information included in the UE pilot information;
        to determine at least one UE of the one or more UEs of the first UE group capable of causing high uplink interference to the second cell based at least in part on the monitored pilot signal transmission;
        to receive, from the first cell, uplink pre-scheduling information for the at least one UE capable of causing high uplink interference to the second cell, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell; and
        to schedule, by the second cell, one or more UE of a second UE group for uplink communication with the second cell based at least in part upon the received uplink pre-scheduling information.

16. The apparatus of claim 15, the at least one processor further configured:
    to estimate interference on an uplink traffic resource of the second cell using the monitored pilot signal transmission by the one or more UEs of the first UE group, wherein the one or more UE of the second UE group is scheduled for uplink communication based at least in part upon the estimated uplink traffic resource interference.

17. The apparatus of claim 16, wherein the at least one processor is configured to estimate interference on an uplink traffic resource by being configured:
    to estimate interference due to data transmission from each UE of the one or more UEs of the first UE group based on interference on the uplink traffic resource estimated from the monitored pilot signal transmissions.

18. The apparatus of claim 17, wherein the at least one processor is further configured to estimate interference on an uplink traffic resource by being configured:
    to use a power offset between a transmit power level for the monitored pilot signal transmission and a transmit power level for data transmission in the uplink traffic resource by the at least one UE to estimate the interference due to data transmission.

19. The apparatus of claim 18, wherein the at least one processor is further configured:
    to receive, from the first cell, transmit power level information for the one or more UEs of the first UE group; and
    to determine the power offset using the transmit power level information.

20. The apparatus of claim 16, wherein the at least one processor is configured to schedule one or more UE of the second UE group for uplink communication with the second cell by being configured:
    to select a particular UE of the second UE group for uplink communication in a resource in which a UE of the at least one UE estimated to cause high interference to the second cell is expected to cause the high interference, wherein the particular UE of the second UE group is selected based at least in part on the estimated interference.

21. The apparatus of claim 16, wherein the at least one processor is configured to schedule one or more UE of the second UE group for uplink communication with the second cell by being configured:
    to select a modulation and coding scheme with respect to an uplink between the second cell and a particular UE of the second UE group, wherein the modulation and coding scheme is selected based at least in part on the estimated interference.

22. The apparatus of claim 16, wherein the at least one processor is configured to schedule one or more UE of the second UE group for uplink communication with the second cell by being configured:
    to avoid scheduling at least one UE of the second UE group for uplink communication in a resource in which a UE of the at least one UE estimated to cause high interference to the second cell is expected to cause the high interference.

23. The apparatus of claim 15, wherein the uplink pre-scheduling information comprises an identity of each UE of the one or more UEs of the first UE group, wherein the identity information is used by the second cell to identify the at least one UE estimated to cause high interference to the second cell.

24. The apparatus of claim 15, wherein the uplink pre-scheduling information comprises information related to transmit power of the at least one UE estimated to cause high interference to the second cell.

25. The apparatus of claim 15, wherein the at least one processor is further configured:
    to reserve uplink traffic resources for repeat request transmission by the at least one UE estimated to cause high interference to the second cell, wherein the reserved uplink traffic resource is not used by the second cell for UEs of the second UE group.

26. The apparatus of claim 15, wherein the at least one processor is further configured:
    to implement an extended repeat request transmission timeline to preschedule the at least one UE estimated to cause high interference to the second cell for retransmission.

27. A method for wireless communication, comprising:
    transmitting, by a first cell to a second cell using a backhaul communication link, user equipment (UE) pilot information, the UE pilot information including information regarding pilot signal transmission by one or more UEs of a first UE group, wherein the one or more UEs of the first UE group are in communication with the first cell;
    determining at least one UE of the one or more UEs of the first UE group capable of causing high uplink interference to the second cell;
    scheduling, by the first cell, UEs of a first UE group for uplink communication with the first cell;
    transmitting, from the first cell to the second cell using the backhaul communication link, information regarding the scheduling for the at least one UE capable of causing high uplink interference as uplink pre-scheduling information, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell; and granting the uplink traffic resource assignments to the UEs of the first UE group a time period after transmitting the uplink pre-scheduling information to accommodate scheduling, by the second cell, one or more UE of a second UE group for uplink communication with the second cell based at least in part upon the received uplink pre-scheduling information.

28. The method of claim 27, further comprising:
transmitting, from the first cell to the second cell using the backhaul communication link, transmit power level offset information with respect to pilot signal transmission and uplink data transmission for the one or more UEs of the first UE group.

29. The method of claim 27, wherein the uplink pre-scheduling information comprises information related to transmit power of the at least one UE estimated to cause high interference to the second cell.

30. The method of claim 27, further comprising:
reserving uplink traffic resources for repeat request transmission by the at least one UE estimated to cause high interference to the second cell, wherein the reserved uplink traffic resource is not used by the second cell for UEs of the second UE group.

31. The method of claim 27, further comprising:
implementing an extended repeat request transmission timeline to preschedule the at least one UE estimated to cause high interference to the second cell for retransmission.

32. An apparatus configured for wireless communication, comprising:
means for transmitting, by a first cell to a second cell using a backhaul communication link, user equipment (UE) pilot information, the UE pilot information including information regarding pilot signal transmission by one or more UEs of a first UE group, wherein the one or more UEs of the first UE group are in communication with the first cell;
means for determining at least one UE of the one or more UEs of the first UE group capable of causing high uplink interference to the second cell;
means for scheduling, by the first cell, UEs of a first UE group for uplink communication with the first cell;
means for transmitting, from the first cell to the second cell using the backhaul communication link, information regarding the scheduling for the at least one UE capable of causing high uplink interference as uplink pre-scheduling information, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell; and
means for granting the uplink traffic resource assignments to the UEs of the first UE group a time period after transmitting the uplink pre-scheduling information to accommodate scheduling, by the second cell, one or more UE of a second UE group for uplink communication with the second cell based at least in part upon the received uplink pre-scheduling information.

33. A computer program product for wireless communications in a wireless network, comprising:
a non-transitory computer-readable medium having program code recorded thereon, the program code including:
program code to transmit, by a first cell to a second cell using a backhaul communication link, user equipment (UE) pilot information, the UE pilot information including information regarding pilot signal transmission by one or more UEs of a first UE group, wherein the one or more UEs of the first UE group are in communication with the first cell;
program code to determine at least one UE of the one or more UEs of the first UE group capable of causing high uplink interference to the second cell;
program code to schedule, by the first cell, UEs of a first UE group for uplink communication with the first cell;
program code to transmit, from the first cell to the second cell using the backhaul communication link, information regarding the scheduling for the at least one UE capable of causing high uplink interference as uplink pre-scheduling information, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell; and
program code to grant the uplink traffic resource assignments to the UEs of the first UE group a time period after transmitting the uplink pre-scheduling information to accommodate scheduling, by the second cell, one or more UE of a second UE group for uplink communication with the second cell based at least in part upon the received uplink pre-scheduling information.

34. An apparatus configured for wireless communication, the apparatus comprising:
at least one processor; and
a memory coupled to the at least one processor,
wherein the at least one processor is configured:
to transmit, by a first cell to a second cell using a backhaul communication link, user equipment (UE) pilot information, the UE pilot information including information regarding pilot signal transmission by one or more UEs of a first UE group, wherein the one or more UEs of the first UE group are in communication with the first cell;
to determine at least one UE of the one or more UEs of the first UE group capable of causing high uplink interference to the second cell;
to schedule, by the first cell, UEs of a first UE group for uplink communication with the first cell;
to transmit, from the first cell to the second cell using the backhaul communication link, information regarding the scheduling for the at least one UE capable of causing high uplink interference as uplink pre-scheduling information, wherein the uplink pre-scheduling information comprises information regarding uplink traffic resource assignments for the at least one UE capable of causing high uplink interference to the second cell prior to an actual uplink traffic resource assignment grant having been made to the at least one UE capable of causing high uplink interference to the second cell; and to grant the uplink traffic resource assignments to the UEs of the first UE group a time period after transmitting the uplink pre-scheduling information to accommodate scheduling, by the second cell, one or more UE of a second UE group for uplink communication with the second cell based at least in part upon the received uplink pre-scheduling information.

35. The apparatus of claim 34, wherein the at least one processor is further configured:

to transmit, from the first cell to the second cell using the backhaul communication link, transmit power level offset information with respect to pilot signal transmission and uplink data transmission for the one or more UEs of the first UE group.

36. The apparatus of claim 34, wherein the uplink pre-scheduling information comprises information related to transmit power of the at least one UE estimated to cause high interference to the second cell.

37. The apparatus of claim 34, wherein the at least one processor is further configured:

to reserve uplink traffic resources for repeat request transmission by the at least one UE estimated to cause high interference to the second cell, wherein the reserved uplink traffic resource is not used by the second cell for UEs of the second UE group.

38. The apparatus of claim 34, wherein the at least one processor is further configured:

to implement an extended repeat request transmission timeline to preschedule the at least one UE estimated to cause high interference to the second cell for retransmission.

* * * * *